United States Patent [19]

Phelps

[11] 3,994,999
[45] *Nov. 30, 1976

[54] COMBINATION WET-DRY COOLING TOWER

[76] Inventor: Peter M. Phelps, 15 Buckeye Way, Kentfield, Calif. 94904

[ * ] Notice: The portion of the term of this patent subsequent to Nov. 4, 1992, has been disclaimed.

[22] Filed: June 27, 1975

[21] Appl. No.: 591,123

Related U.S. Application Data

[63] Continuation-in-part of Ser. No. 327,154, Jan. 26, 1973, Pat. No. 3,917,764.

[52] U.S. Cl. ............................. 261/159; 261/112; 261/DIG. 11; 261/DIG. 77
[51] Int. Cl.² ............................................ F28C 1/04
[58] Field of Search .............. 261/DIG. 77, DIG. 11, 261/111, 112, 24, 159

[56] References Cited
UNITED STATES PATENTS

| | | | |
|---|---|---|---|
| 3,227,429 | 1/1966 | Renzi | 261/112 |
| 3,262,682 | 7/1966 | Bredberg | 261/112 |
| 3,395,903 | 8/1968 | Norback et al. | 261/112 |
| 3,635,042 | 1/1972 | Spangemacher | 261/DIG. 77 |
| 3,643,931 | 2/1972 | Henning et al. | 261/112 |
| 3,782,451 | 1/1924 | Cates | 261/DIG. 77 |
| 3,865,911 | 2/1975 | Lefevre | 261/DIG. 11 |
| 3,917,764 | 11/1975 | Phelps | 261/111 |

Primary Examiner—Tim R. Miles
Assistant Examiner—Gregory N. Clements
Attorney, Agent, or Firm—Flehr, Hohbach, Test, Albritton & Herbert

[57] ABSTRACT

A wet-dry cooling tower with an upper tubular heat exchange section superposed over a lower sloped film fill section. The film fill comprises a number of spaced sheets, preferably of the corrugated type. Also, splash-type fill may be disposed on either side of the film fill for increased gas-liquid contact. After partial cooling in the upper tubular section, liquid is either directed to the lower film fill section or bypasses it depending on cooling requirements.

9 Claims, 7 Drawing Figures

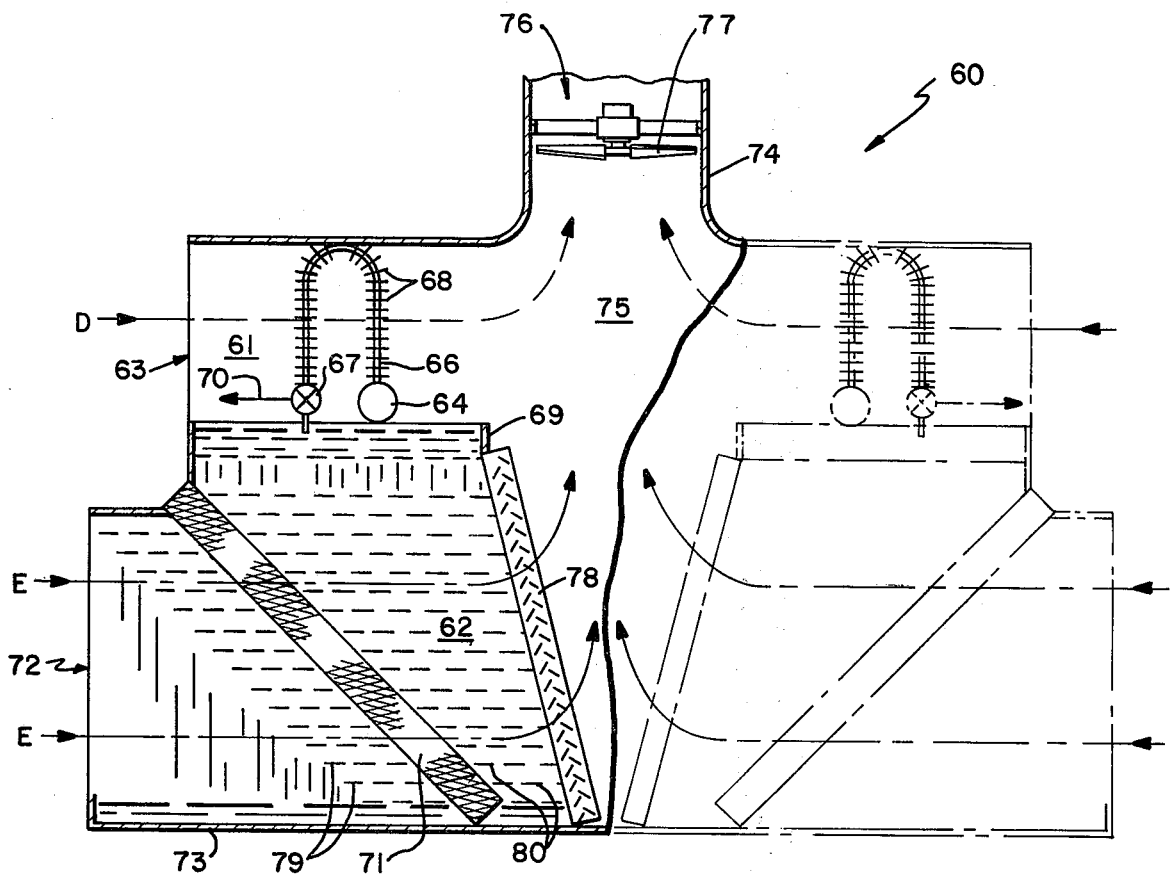
FIG.—3
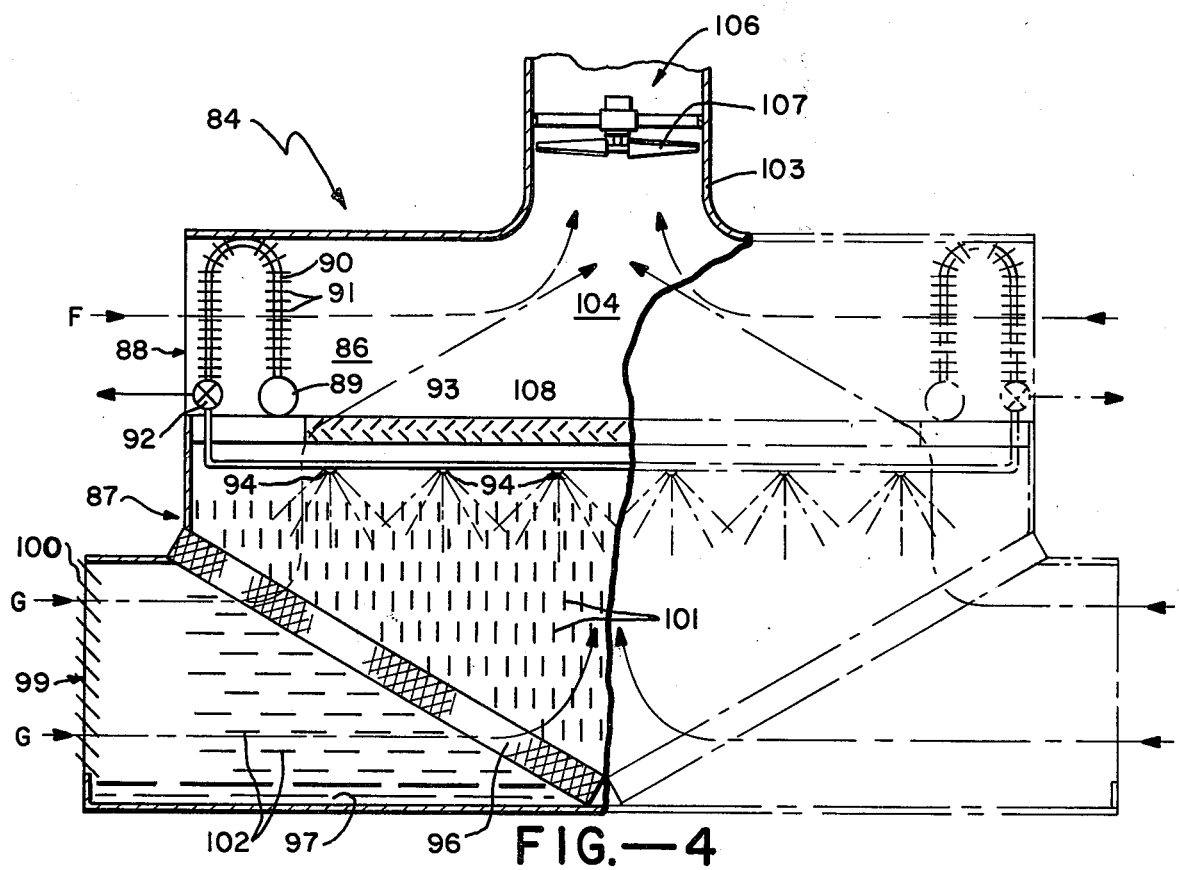
FIG.—4

COMBINATION WET-DRY COOLING TOWER

CROSS-REFERENCE TO RELATED APPLICATION

This application is a continuation-in-part of my copending application, U.S. Ser. No. 327,154, filed Jan. 26, 1973 now U.S. Pat. No. 3,917,764.

BACKGROUND OF THE INVENTION

There are a number of different specific cooling tower configurations for cooling a liquid (e.g., water) stream with a gas (e.g., air) stream. However, such configurations can be characterized as either of the tubular heat exchange type or the direct gas-liquid contact type. In the tubular type, water is passed through tubes formed of conductive material (e.g., copper) which are conventionally provided with fins to present more heat transfer surface to the air. Air flowing across such tubes cools the water sensibly, i.e., without evaporation.

The technique of direct exposure of the water to the air stream is the most common type of cooling tower. Direct contact cooling is significantly more efficient than tubular cooling because the latent heat of evaporation of the water materially assists the cooling process. The cooling tower is filled with medium, conventionally of either the crossflow or counterflow type, formed from relatively inexpensive materials, such as wood or plastic, in comparison to the more expensive heat exchange tubes formed of conductive metal. However, a major disadvantage of evaporative cooling is the loss of a portion of the water to the atmosphere during evaporation. This is a particular disadvantage in areas, such as desert regions, wherein water is becoming increasingly scarce.

Wet cooling is employed in certain cooling and condensing processes, such as steam turbine operations, wherein it is essential to cool the liquid to a low absolute temperature. This is because water can be cooled to a lower temperature in the presence of evaporative cooling. Thus, in the turbine operations, warmer temperatures which would be produced with dry cooling can adversely affect plant cycle efficiencies.

Towers have been constructed which employ dry cooling in a tubular section above a wet cooling section and are designated "wet-dry cooling towers". The partial dry-cooling is utilized to reduce the amount of moisture discharged from a tower where water is in short supply or to minimize an objectionable fog which might be discharged from the tower. It is apparent that in a wet-dry cooling tower, there is a net loss in effective utilization of the air because of the inherent inefficiency of the dry cooling tower. Thus, where the wet-dry cooling tower is employed, as to conserve water, it is important to maximize the efficiency of the wet section of the cooling tower to counter-balance the loss in efficiency of the dry section.

Conventional wet cooling sections are of either the counterflow or crossflow type. The former employs a generally horizontal fill section with an air opening below the lower surface of the same. Counterflow fills of the film type have a relatively good heat transfer coefficient. The air is drawn from below the fill and out the tower by a fan positioned above the fill. When the distance between the fill and base of the tower is relatively small, the air must be drawn from the surroundings into the tower at a relatively high velocity and, when it reaches a position below the fill, it is forced to turn abruptly at a sharp angle to proceed upwardly through the fill. This requires high fan power requirements. On the other hand, by building the tower on relatively high supporting legs, the velocity of the incoming air is somewhat reduced but the overall height of the tower is substantially increased. Among the disadvantages of such height increases are increased pumping head, structural wind loads, and general appearance.

Conventional crossflow cooling sections comprise a relatively thin vertical fill section with the water being fed from an overhead source and the air being drawn therethrough from air inlets at the side of the tower. Since there is no necessity for the air to make radical changes of direction in the fill and the air inlet is spaced along the entire height of the fill, the overall fan power requirements are usually less than those of a conventional counterflow tower as set forth above.

A crossflow cooling section is inherently less efficient with respect to heat transfer than a counterflow section based on a unit of fill. Another disadvantage of a crossflow cooling section is that the water is loaded onto the top of the relatively thin crossflow fill. There is a maximum water load beyond which the water will not redistribute effectively because it will start gushing in a steady stream through the section. When this maximum water load is exceeded in a crossflow section of the film fill type, the water will not cling to the fill leading to relatively poor heat transfer between the air and water. Also, resistance to the transversely flowing air is substantially increased requiring excessive fan power. This problem of water loading cannot be effectively overcome by widening the fill in the direction of air flow because there is a limiting factor on cooling efficiency relative to the thickness of the fill. A major factor in this limit is that the fan power for the longer air path through the fill disproportionately increases in comparison to the advantages to be attained by easing the above water load problems.

A theoretical attempt to combine certain counterflow and crossflow features was made in U.S. Pat. 3,227,429 in which a series of offset cellular units with all walls of the cells inclined to the horizontal are illustrated in FIG. 12. The gas and liquid travel in the same direction, either concurrently or countercurrently, generally parallel to the cell side walls. Since the bottom cell walls or splash plates of the above patent are inclined at a steep angle, the liquid flows through the packing in rushing streams, rather than gradually descending in a gravitating path, and so does not spread out into thin films onto the side walls of the cells. The liquid actually concentrates rather than spreading out. This rapid concentrated flow of liquid greatly reduces the efficiency of the illustrated packing.

SUMMARY OF THE INVENTION AND OBJECTS

It is a general object of the invention to provide a wet-dry cooling tower for contacting liquid and gas with a wet section which combines certain of the aforementioned advantages of the counterflow and crossflow towers while eliminating certain disadvantages of the same.

It is a specific object of the invention to provide a cooling tower of the above type in which the wet section comprises sloped film fill.

It is a specific object of the invention to fit an existing conventional cooling tower with a dry section above the above type of wet section to yield good overall efficiency.

Other objects of the invention will be apparent from the following description taken in conjunction with the appended drawings.

In accordance with the above objects, the present invention relates to a wet-dry cooling tower with an upper dry tubular section superposed over a lower wet section comprising film fill means having an inclined or sloped principal plane adjacent a lower gas inlet opening. The tubular heat exchange means includes one or more heat exchange tubes adjacent an upper gas inlet opening. Liquid is directed through the heat exchange tubes and is cooled by contact with air passing through the inlet opening. The cooled liquid is directed to means for supplying the same by gravity flow to the upper portion of the sloped film fill section. With this liquid supply means in the form of a perforated distribution pan, the outlet from the heat exchange tube is disposed above the pan in a position to deposit water onto the same. With the liquid supply means to the film fill means in the form of spray nozzles in a conduit, a connection is provided for water from the dry cooling section to the wet cooling section. In either event, it is advantageous to provide valve means having a first position for conveying liquid to the film fill section and a second position for bypassing it. Thus, during times when the cooling requirements are fully satisfied by the dry upper portion of the tower (e.g., in the wintertime), the lower portion of the tower may be bypassed with a consequent conservation of water.

Referring to the lower wet section, the film fill means has a principal plane inclined at an angle of between 20° and 70° to the vertical. The film fill means comprises a plurality of upright sheets mounted so that adjacent sheets are sufficiently spaced for the passage of gas and liquid and being formed to spread the liquid gravitating onto the upper surface of the means into a thinner, more uniform film at the lower surface thereof. Splash-type fill comprising splash decks may be disposed either to the interior or exterior of the film fill means to increase gas-liquid contact. When the air is to be directed generally horizontally toward the interior of the film fill means, the splash-type fill will be generally horizontal. On the other hand, when the air is to be redirected to a generally vertical direction, the splash decks will be disposed in a generally upright direction.

In one type of film fill means, spacer elements extending between adjacent ones of the sheets are utilized to mount the same in parallel side-by-side relationship. Such spacer elements are of a size and shape which neither substantially impede the vertical flow of gravitating liquid nor cause collection of the same in concentrated streams. In this manner, the liquid gravitating onto the upper surface is spread into a thinner, more uniform film at the lower surface. Also, the sheets may include spacedapart indentations to enhance mixing of gas and liquid.

In another type of film fill means, the parallel sheets are of the corrugated type having ridges and grooves so that sufficient space is provided between grooves of adjacent sheets for the passage of gas and liquid. By disposing the ridges of alternate sheets across the ridges disposed between alternate sheets, spacing between sheets is accomplished without the necessity of spacer elements. Alternatively, such spacer elements may be employed. One advantage of utilizing corrugated sheets in conjunction with the inclined film fill is that the air may be independently channelled to a low resistance air path, e.g., relatively horizontal, while the liquid, in contrast, is forced to proceed through a tortuous path. This combination increases gas-liquid contact while reducing the fan power requirements. For this purpose, the corrugations are disposed at an inclination between 0° and 45° to the horizontal.

BRIEF DESCRIPTION OF THE DRAWINGS

FIGS. 3 and 4 schematically illustrate complete wet-dry cooling towers employing sloped film fill sections.

DETAILED DESCRIPTION OF THE PREFERRED EMBODIMENTS

In general, the present invention concerns the utilization of sloped film fill in the wet section of a wet-dry tower for contacting gas and liquid. As defined herein, the "wet" section of the tower is that section in which the gas and liquid are in direct contact, while the "dry" section is that section in which the liquid flows through conduits or tubes and is cooled indirectly by heat transfer through the tube walls. Although useful in gas stripping and the like, such towers will be designated "cooling towers" herein as they are most commonly utilized for cooling a liquid, such as water, by inducing the surrounding gas, air, into the tower to cool the liquid, water. As will be more fully described hereinafter, by sloping the film fill in the wet section, the advantages of both counterflow and crossflow cooling are combined.

As illustrated in FIGS. 3 and 4, the film fill means of the wet section is disposed below the dry tubular section with the partially cooled liquid from the dry section gravitating to the wet section. The wet sloped film fill means will be described in detail prior to the description of the combined tower and tubular section set forth in FIGS. 1 and 2.

FIRST EMBODIMENT OF SLOPED FILM FILL SECTION

Figure 1:
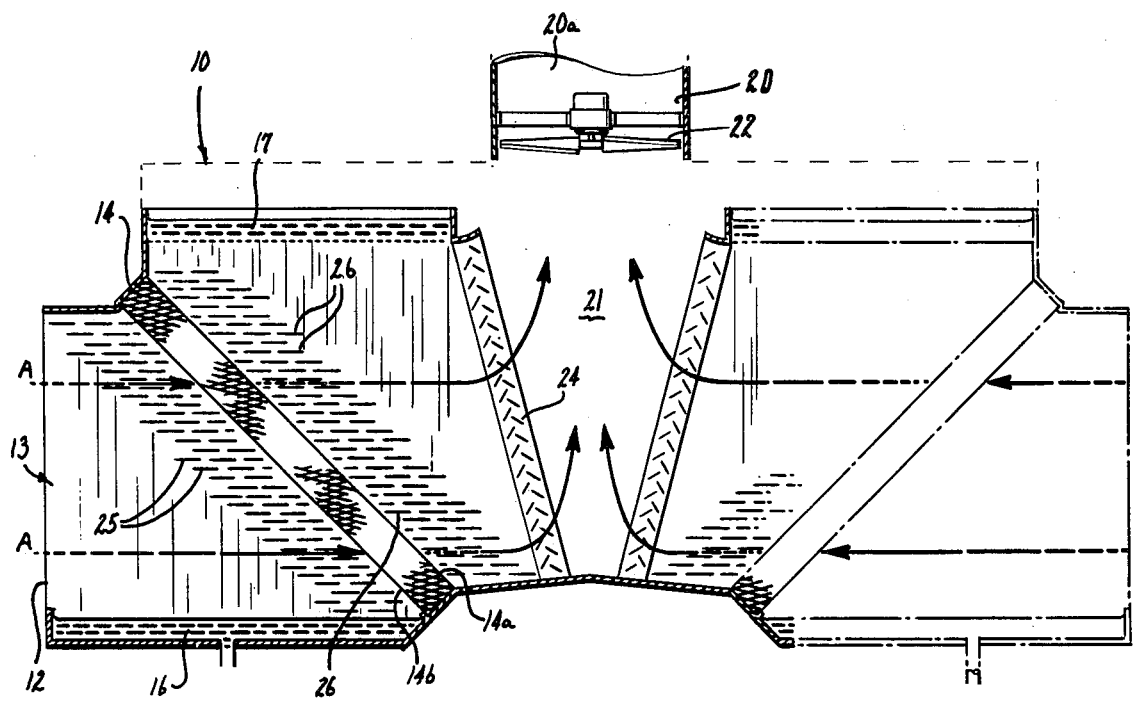
FIGS. 1 and 2 schematically illustrate different embodiments of sloped film fill sections employed in the wet-dry tower of the present invention.

Referring to FIG. 1, the lower or wet section of the cooling tower, broadly denoted by the number 10, is illustrated comprising two similar cooling sections disposed on opposite sides of a central plenum chamber. For simplicity of description, only the section illustrated in the left portion of the drawing will be described. This section includes an upright side wall 12 having a gas inlet opening 13 extending along the major portion of the side wall and defined by a framing portion of the same. A film type fill assembly 14 of a type to be described more fully hereinafter, is suitably mounted in the cooling tower as by brackets or the like and having a principal plane inclined at a substantial angle to both the vertical and horizontal, 45° in the illustrated position. This angle may be substantially varied between about 20° and 70° depending upon the type of functional characteristics required for the section. Fill assembly 14 is generally rectangular and has an upper surface 14a in communication with a major portion of the gravitating liquid (preferably with essentially all of the liquid). Assembly 14 also includes a lower surface 14b in communication with a major portion of gas entering inlet opening 13 (preferably with essentially all of the gas). A substantial portion of film fill assembly 14 is disposed at the same general elevation as gas inlet opening 13.

A cooled liquid basin 16 is disposed below assembly 14 in a position to receive liquid gravitating therefrom, and water supply means comprising an open top perforate distribution pan or tray 17 is positioned directly above film assembly 14 to receive water to be cooled from the upper dry section, not shown, and to permit it to gravitate through the apertures or perforations onto the film assembly upper surface 14a. Suitable pumping structure, not shown, is operably coupled to basin 16 for removing liquid and for delivering the liquid to equipment requiring the same for cooling and for returning the same to the upper, dry section.

Referring again to FIG. 1, a vertical stack 20 is secured to the tower top face above the upper, dry section (not shown) and extends upwardly from a central plenum chamber 21 to define an upper outlet opening 20a for gas (air) exiting therefrom. Fan means 22 positioned within stack 20, adapted to be operably coupled to a suitable source of power for actuation, causes currents of air to be drawn through assembly 14 generally along path A and forced upwardly through chamber 21 and stack 20 for discharge through the upper portion of the latter. Alternatively, the cooling tower may be operated by natural induction by the elimination of fan means 22 in which case air would be induced to flow through the fill assembly by means of natural convection of the warm exhaust air rising through chamber 21.

A drift eliminator wall 24 is disposed across the path of air extending from the cooling section and in a generally upright position to minimize gravitating water from being carried as a spray into the plenum chamber. Wall 24 may be of any conventional type, such as a series of spaced inclined baffles, to permit the free flow of air therethrough but to prevent significant quantities of liquid droplets to escape into the plenum chamber.

Referring again to FIG. 1, optionally conventional crossflow splash-type fill, such as generally horizontal slats 25 is disposed in an area of the tower between film fill assembly 14 and gas inlet opening 13 to further redistribute water gravitating from assembly 14. Other optional splash-type fill 26 of the above type is disposed between fill assembly 14 and plenum chamber 21 to intercept water gravitating from pan 17 before contacting the upper surface of assembly 14. The horizontal slatted splash-type fill does not change the general direction of air therethrough until it reaches the plenum chamber. It requires less fan power to change the direction of the air in the plenum chamber in the absence of the gravitating liquid. In the above arrangement, the air is traveling in a generally horizontal direction through the splash plates or decks transversely to the gravitating liquid.

Although not illustrated in FIG. 1, the splash plates may be disposed in a generally vertical direction so that the water and liquid contacted each other in counterflow relationship. In this embodiment, the splash fill would be deemed to be of a counterflow type.

TYPES OF FILM FILL

Figure 5:
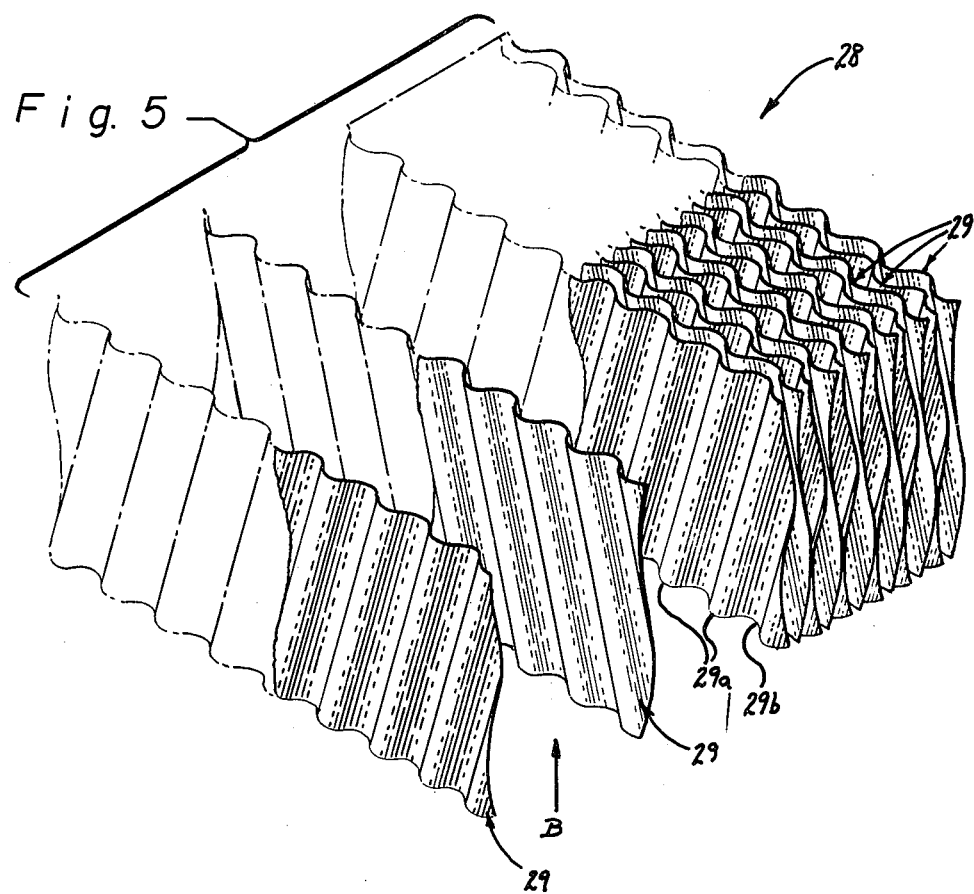
FIGS. 5, 6 and 7 illustrate various types of film fill to be utilized in the towers of FIGS. 1–4.

Referring to FIG. 5, a corrugated film fill, generally designated 28, is illustrated which is extremely well suited for use in the film fill assembly 14 in accordance with the present invention. Film fill 28, designated the crossed corrugation film fill, comprises a plurality of upright corrugated sheets 29 with ridges 29a and grooves 29b disposed so that ridges of alternate sheets cross and abut against the ridges disposed between alternate sheets to form channels therebetween. Sheets 29 preferably are essentially vertically disposed to provide an essentially vertical path to the gravitating liquid. The channels have a constantly varying width from 0 at the contact points between the sheets to a maximum of twice the distance between the ridges and grooves of individual sheets. In the illustrated embodiment, the corrugations extend between the upper and lower film fill assembly surfaces 14a and 14b, respectively. It is preferred that the air travel into and out of the corrugated fill in a path generally parallel to sheets 29 (e.g., along path B) without unnecessary redirection of the air stream to avoid consequent increased fan power requirements. This is accomplished by disposing the sheets generally parallel to the air path.

Sheets 29 are preferably liquid or water repelling materials such as cellulose or asbestos. Paper sheets may be impregnated with a suitable substance such as a resin to impart the required mechanical strength. The sheets may be interconnected at the points of contact by means of adhesive qualities of the resin. Other preferably adhesive means may be utilized to interconnect sheets 29 to form assembly 14.

The angle that the corrugations of sheets 29 assume with respect to mounted assembly 14 may be varied substantially in accordance with heat transfer requirements of the particular tower. In one preferred embodiment, a major portion of the corrugations are at an inclination of 0° to 45° to the horizontal. The horizontally flowing air along the path of arrow A has a relatively easy path through fill assembly 14 as it is not required to abruptly change its direction. This leads to relatively low fan power requirements. Simultaneously, the same fill provides a relatively tortuous path for the gravitating liquid to increase the redistribution and spreading of the liquid onto the fill surface. This is not possible in conventional counterflow towers since variation in the slope of the corrugations in the fill affects both the liquid and gas path in a corresponding manner.

The angles between the corrugations of adjacent sheets 29 in film fill 28 may be varied substantially in accordance with the present invention. However, it is preferable that this angle be relatively small, say no greater than 30° to 45°, viewed in the direction of the air path. Where the bisector of the included angle between crossed corrugations is relatively horizontal, reduction of the included angle facilitates air passage through the fill to reduce the fan power requirements.

A cross corrugation arrangement of film fill 28 is well suited to the inclined film fill assembly of the present invention. This cross corrugation arrangement facilitates the film formation of the water as it spreads out since it presents a number of contact points between adjacent sheets for changing the direction of the water and thus slowing down the residence time of the water in the fill. For a relatively small included angle in the direction of the air path of the above type and a relatively horizontal angle bisector, the water is presented with crossing corrugations which disrupt and redistribute the water in a substantially more effective manner than the air. This is because the included angle in the direction of liquid flow is substantially greater than in the direction of air flow.

Referring again to FIG. 1, the inclination of the principal plane of the film fill assembly is illustrated as 45° to the vertical. It should be understood that this angle may be varied substantially between about 20° and 70° to the vertical depending on the requirements of the particular tower to be employed.

Figure 6:
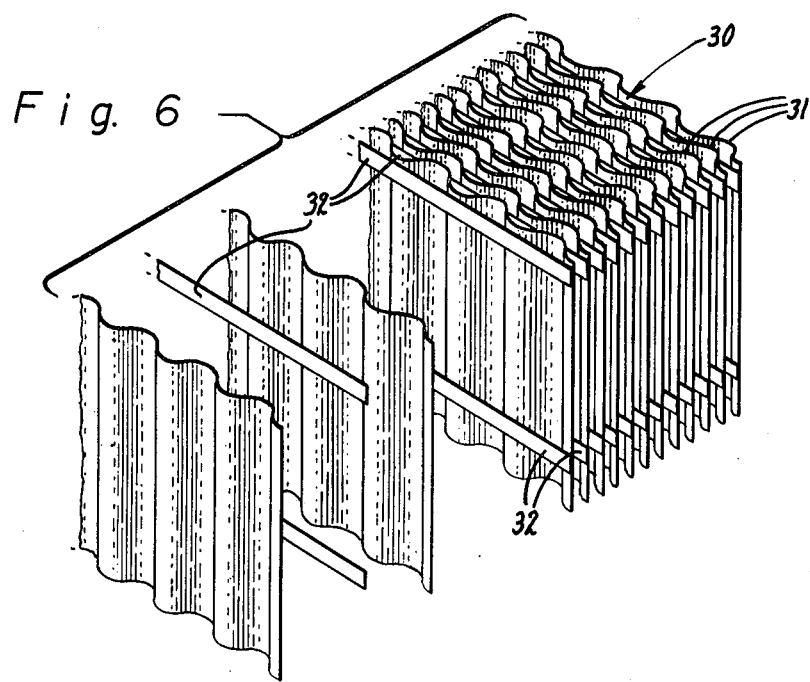

Another type of film fill which can be utilized in film fill assembly 14 of FIG. 1 is illustrated in FIG. 6 and generally designated as "parallel, spaced" corrugated film fill 30 comprising sheets 31. Each sheet 31 includes corrugations generally parallel to facing adjacent sheets which are spaced apart by suitable spacer elements 32. The same general type of corrugated sheets described in FIG. 5 may be employed for the sheets of FIG. 6. One advantage of the parallel corrugation configuration is that where the corrugations are disposed in fill assembly 14 in a generally horizontal direction, they present a relatively unobstructed path for the gas flowing along arrow A leading to low fan power requirements. Because independent spacer elements are provided, the liquid can gravitate in a film down the corrugations even when they are disposed in a horizontal direction. For this purpose, it is generally preferable to align the grooves of ridges with corresponding grooves and ridges of adjacent sheets so that there is no blockage therebetween to liquid flow.

Figure 7:
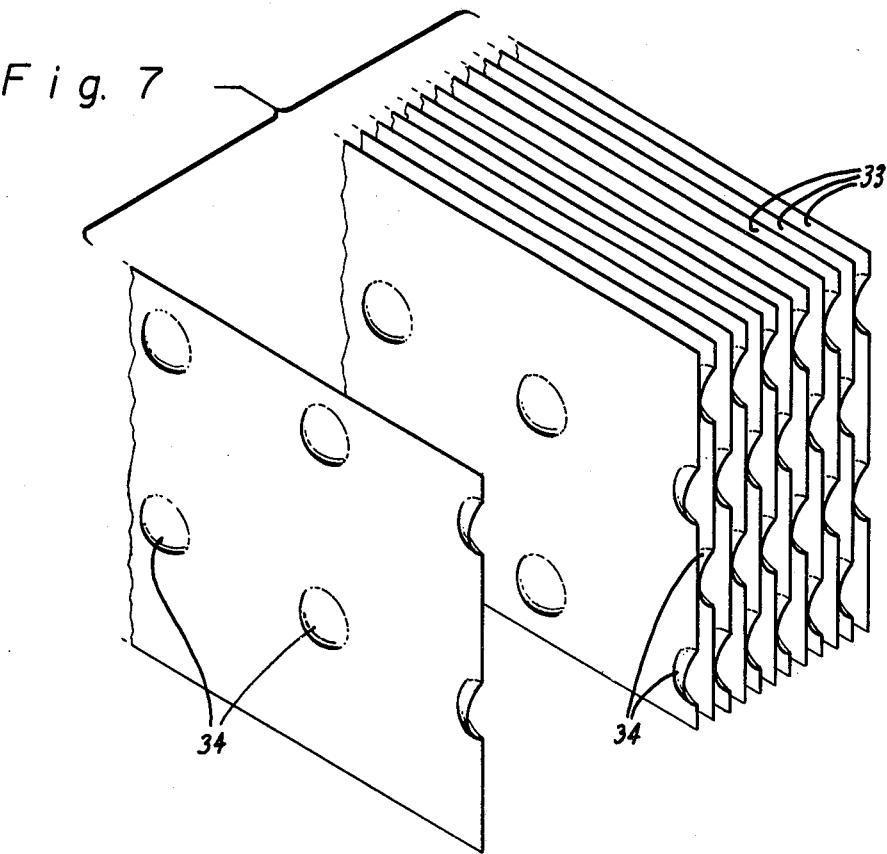

Another type of film type fill which may be employed in the fill assembly 14 of FIG. 1 is illustrated in FIG. 7 and comprises parallel essentially flat sheets 33 with spaced-apart hemispherical indentations 34 serving to disrupt the vertical flow of liquid along the sheets to enhance mixing of the gas and liquid, and to space apart the sheets without independent spacers. This spacing function is accomplished by the convex side of each sheet abutting against a flat portion of an adjacent sheet. In an alternative, not shown, the sheets may be of an essentially flat configuration with independent spacer elements disposed to extend between adjacent spaced sheets. However, such spacer elements extending between adjacent sheets are of a size and shape which neither substantially impede the vertical flow of gravitating flow of liquid nor cause collection of the same in concentrated streams.

All of the foregoing film fill types spread liquid gravitating onto the upper surface 14a of film fill assembly 14 into a thinner, more uniform film at the lower surface 14b to maximize the efficiency of the film type fill.

SECOND EMBODIMENT OF SLOPED FILM FILL SECTION

Figure 2:
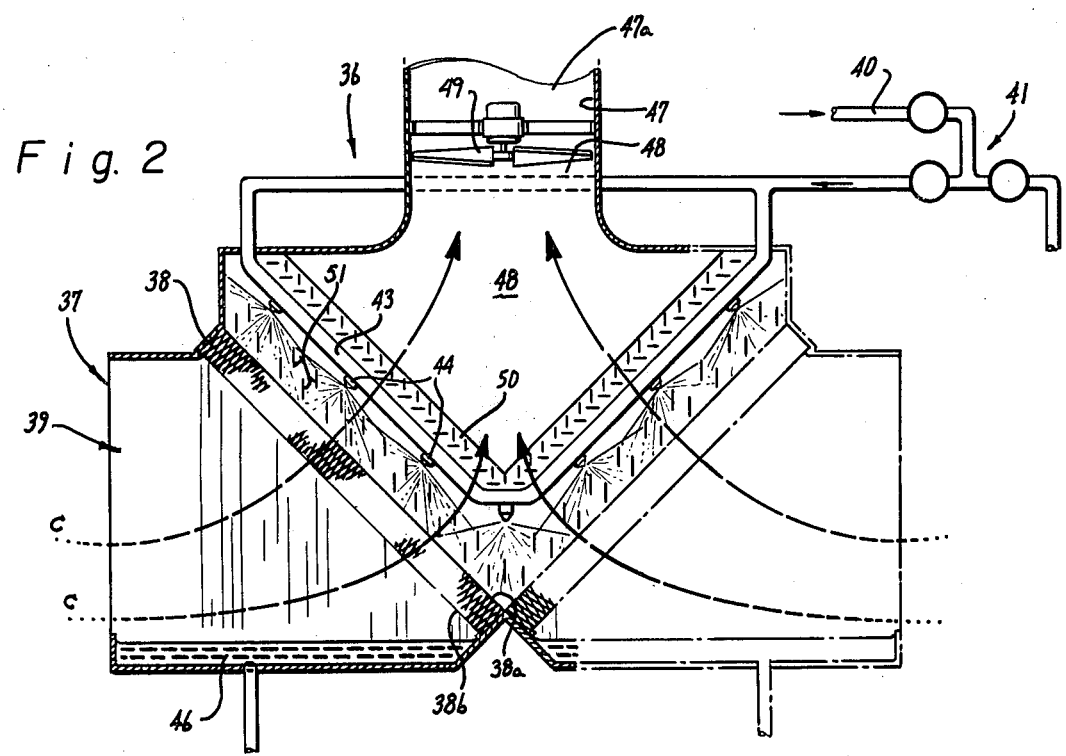

Referring to FIG. 2, another embodiment of a sloped film fill section, suitable for use in the wet-dry cooling tower according to the present invention is illustrated and is broadly denoted by the number 36. The section includes a side wall 37 and a sloped film fill assembly 38 having upper and lower surfaces 38a and 38b, respectively. A gas inlet opening 39 is defined in tower side wall 37 so that a substantial portion is at the same general elevation as fill assembly 38. The liquid to be cooled is supplied in line 40 from the upper, dry section (not shown) and proceeds through valve combination 41 having a first position for passage to liquid supply means for the wet section, such as header 43, and a second position to bypass header 43 for direct discharge, as during winter, when wet cooling may not be necessary. Header 43 includes suitable nozzles 44 serving to supply liquid to the upper surface 38a. Alternatively, distribution troughs, not shown, may be employed. A major portion of the gravitating liquid passes through fill assembly 38 and into cooled water basin 46 disposed below assembly 38. Suitable pump structure, not shown, is operably coupled to basin 46 and header 43 for removing cooled water from the former and delivering the same to equipment for cooling and returning the thus-warmed water to the upper, dry section and then to header 43.

Referring again to FIG. 2, a vertical stack 47 is secured to the top face of the tower above the upper, dry section (not shown) extending upwardly from a central plenum chamber 48 to form an upper outlet 47a for air exiting therefrom. Fan means 49 positioned within stack 47, adapted to be operably coupled to a suitable source of power for actuation, causes currents of air to be drawn through assembly 38 and upwardly through chamber 48 and stack 47 for discharge generally along path C.

Drift eliminator wall 50 is provided above header 43 of a conventional type as discussed above. The drift eliminators serve to prevent excessive amounts of liquid from being drawn upwardly out the tower through outlet 47a.

Countercurrent splash-type fill comprising upright generally vertical splash plates 51 are provided between header 43 and fill assembly 38. Such splash-type fill generally of the counterflow type serves to assist the gas-liquid contact to increase the efficiency of the tower and to redirect the air.

The section of FIG. 2 differs functionally from the section of FIG. 1 in that the air along path C is forced to change directions from the generally horizontal inlet opening to the generally vertical outlet opening in the vicinity of the fill assembly 38. This requires a somewhat higher fan power than the tower of FIG. 1. On the other hand, the overall tower size is greatly reduced by the ability to position the lower end of sloped fill assembly 38 adjacent the lower end of a facing sloped fill assembly (illustrated in phantom) on the opposite side of the tower. The gas-liquid contact in the section of FIG. 1 is analogous to that in a crossflow section, while the gas-liquid contact in the section of FIG. 2 is analogous to that in a counterflow tower.

It is apparent from the embodiments of both FIGS. 1 and 2 that the sloped fill assemblies are preferably disposed to intersect the major portion and preferably all of the water gravitating from the liquid supply means to maximize the efficiency of the film fill.

Fill for film fill assembly 38 may be of any of the general types set forth above with respect to FIGS. 5–7. When it is deemed desirable to redirect the air within the film fill, corrugated fill such as the type illustrated in FIGS. 5 and 6 may be employed. It is preferred that the parallel corrugations of FIG. 6 or the bisector of the included angle of corrugations of FIG. 5 be disposed generally toward the desired new direction.

Utilizing the film fill means described above in fill assembly 38 of FIG. 2, liquid gravitating from header 43 onto upper surface 38a is spread out into a thinner, more uniform film upon passage through assembly 38 and so upon exit from lower surface 38b.

One feature of utilizing the parallel spaced sheet configuration in the sloped fill of the present invention is common to both of the foregoing embodiments. That is, the air tends to take the shortest path through the film fill assembly in the absence of strong directional internal construction set as closely spaced corrugations. In contrast, the liquid tends to flow in an essentially vertical path. Thus, the path of the liquid is generally longer than the path of the gas resulting in lower fan power requirements and higher efficiency of the tower. This is to be contrasted with conventional countercurrent fill in which the gas and liquid have a path of essentially the same length.

A number of different cooling tower sections have been described above utilizing the sloped film fill assemblies of the present invention. It should be understood that variations may be made in both the type of fill and the film fill configurations without departing from the scope of the present invention. For example, although the invention has been described with respect to one film fill assembly, it should be apparent that two or more may be utilized as illustrated in FIGS. 3 and 4 of my aforementioned copending application. In addition, corrugated fill may be used which does not have straight line corrugations. Also, one or more film fill assemblies of the foregoing type may be stacked without spacing therebetween. Furthermore, auxiliary fill other than of the splash type (e.g., widely spaced film fill) which functions in the manner of splash fill may be used in place of the splash fill for combination with the sloped film fill assembly of the present invention.

FIRST EMBODIMENT OF WET-DRY COOLING TOWER

Referring to FIG. 3, a first embodiment of a wet-dry cooling tower is illustrated including an upper dry cooling section above a lower wet sloped film fill cooling section. The latter section includes generally crossflow liquid-gas contact similar to that illustrated in FIG. 1. The tower, broadly denoted by the number 60, includes an upper dry tubular heat exchange section 61 and a lower wet section 62. Identical sections are disposed on opposite sides of a central plenum chamber. For simplicity of description, only the section illustrated on the left portion of the drawing will be described.

Referring to the upper dry section, an upper gas inlet opening 63 is defined by a framing portion of the tower side wall. Tubular heat exchange means is suitably mounted in upper section 61 to intersect gas entering opening 63. Such heat exchange means includes header 64 connected to a plurality of generally parallel upright heat exchange tubes in spaced-apart relationship disposed to intersect the air entering inlet 63. One of such tubes is designated by the numeral 66. The liquid to be cooled, conventionally water, is supplied to an inlet opening of header 64 and flows through tubes 66 to an outlet, suitably valve 67. Tubes 66 are formed of a conventional heat-conductive material, such as thin copper pipe, and are provided with spaced fins 68 to provide additional heat transfer surface to the flowing gas. An open topped perforate distribution pan or tray 69 is positioned below valve 67 to receive liquid gravitating therefrom and serves as water supply means for the lower wet section 62 as described hereinafter.

Valve 67 is operable between a first position in which liquid is allowed to gravitate into distribution pan 69 for flow through the lower wet section of the tower, and a second position in which the partially cooled liquid is directed to flow through discharge line 70 thereby bypassing wet section 62. This second valve position is employed when the dry section 61 provides all of the cooling requirements as, for example, on a cool winter day. This avoids ice formation in the wet section and also eliminates fog discharge from the fan stack. During warm weather, the water is permitted to descend into distribution pan 69 for further cooling.

Referring again to FIG. 3, liquid from pan 69 gravitates through the perforations onto the upper surface of sloped film fill assembly 71. The last named assembly is mounted in the cooling tower, as by brackets or the like, and includes a principal plane inclined between about 20° and 70° to the vertical. It is generally rectangular and is disposed at the same general elevation as a lower gas inlet opening 72. A cooled liquid basin 73 is disposed below assembly 71 in a position to receive liquid gravitating therefrom. Suitable pumping structure, not shown, may be operably coupled to basin 73 for removing liquid and delivering it to equipment requiring the same for cooling and returning it to header 64.

Referring again to FIG. 3, a vertical stack 74 is secured to the tower top wall above dry section 61 and extends upwardly from a central plenum chamber 75 to define an upper outlet opening 76 for gas exiting therefrom. Fan means 77, positioned within stack 76, is adapted to be operably coupled to a suitable source of power for actuation to cause currents of air to be drawn through the dry and wet sections generally along paths D and E, respectively, for passage through outlet 76. Alternatively, natural induction may be employed.

A drift eliminator wall 78 is disposed across a path of air exiting from wet section 62 to minimize gravitating water from being carried as a spray into the plenum chamber. The wall 78 may be of any conventional type, such as set forth with respect to FIG. 1.

Referring again to FIG. 3, conventional, crossflow splash-type fill, such as generally horizontal slats 79, is disposed in an area of the tower between film fill assembly 71 and gas inlet opening 72. Other optional splash-type fill 80 of the above type is disposed between sloped film fill assembly 71 and plenum chamber 75 to intercept water gravitating from pan 69 for redistribution before contacting the upper surface of the assembly 71. The general function and effect of such splash-fill in the sloped film fill section is set forth above with respect to FIG. 1 and is incorporated by reference at this point.

The type and disposition of sloped film fill assembly 71 is the same as that set forth with respect to FIG. 1. Accordingly, that description is incorporated at this point by reference. Adjustable louvers 81 are provided to redirect air flow through inlet 72 to a desired direction.

In operation of the above tower, water to be cooled is supplied to header 64 which distributes the water into tubes 66 in which the water is cooled by air during its flow along the length of pipes 66 into manifold valve 67. When further cooling is not required, the liquid flows out discharge pipe 70. When such cooling is required, the liquid gravitates into pan 69 and falls through the pan perforations into sloped film fill section 62. The air entering inlet opening 63 contacts the outside surface of conductive pipes 66 to cool the pipes and water flowing in them. The air path is generally illustrated by arrow D.

In the wet section, the water is first contacted by optional splash fill plates 80 causing a spreading of the water which then falls onto upper surface of sloped film fill assembly 71. This water then forms films on the sheets of the assembly and falls in an essentially vertical direction to contact splash fill plates 79 for further distribution of the water. The air flows into section 62 generally along arrows E analogous to crossflow.

Cooling by contact with the air in the lower portion of the tower is assisted by an evaporative cooling effect and is very efficient. This counterbalances the relative inefficiency of the upper dry section 61 which is employed for conservation of the water as noted above.

Referring to FIG. 4, another embodiment of the wet-dry cooling tower is illustrated generally indicated by the number 84. The tower includes an upper dry portion 86 and a lower wet portion 87. The upper portion includes an upper gas inlet 88 and header 89 disposed at essentially the same elevation, for distributing water into cooling tubes 90 provided with fins 91 as generally described above. Water flows through tubes 90 from header 89 to an outlet valve 92. The air travels generally along path F as illustrated in the drawing. The foregoing description of the tubular heat exchange means described in FIG. 3 is incorporated at this point by reference.

The lower or dry section of the tower is different in configuration from the same section of FIG. 3. It includes liquid supply means for the wet cooling section comprising an array of conduits 93 operatively connected to valve means 92 with spray nozzles at spaced intervals along the conduits. Sloped film fill assembly 96 of the foregoing type is mounted below the spray nozzles. A cooled liquid basin 97 is disposed below fill assembly 96 in a position to receive liquid gravitating therefrom. Film fill assembly 96 is disposed adjacent to and at the same general elevation as air inlet opening 99 provided with adjustable air-directing louvers 100. Optional vertically disposed splash-type film 101 is positioned below spray nozzles 94 and above film fill assembly 96 serving to redirect air entering inlet opening 99 from a generally horizontal to a generally vertical direction as illustrated by arrows G of FIG. 4. Further optional splash-type fill 102 comprising horizontal splash decks may be provided below film fill assembly 96 to redistribute water gravitating therefrom for further contact with the entering gas stream.

Referring again to FIG. 4, a vertical stack 103 is secured to the tower top wall and extends upwardly from a central plenum chamber 104 to provide an upper outlet opening 106 for exiting gas. Fan means 107 is positioned within stack 103 for purposes set forth above.

A generally horizontal drift wall 108 is disposed directly above conduit 93 across the path of air exiting from the wet cooling section 87 to minimize the gravitating water from being carried as a spray to the plenum chamber.

Operation of the cooling tower of FIG. 4 is similar to that tower of FIG. 3 with the following exception. Instead of the partially cooled water from cooling tubes 90 passing through valve 92 into distribution pans, it passes directly into conduits 93 for spray from nozzles 94 as gravitating liquid onto the upper surface of film fill means 96. The air-liquid is relatively in counterflow relation compared to the embodiment of FIG. 3.

It is apparent from the foregoing, that a wetdry cooling tower has been provided which is particularly adapted for use in the conservation of water while also providing acceptable heat transfer efficiencies. The lower sloped film fill section, being an extremely efficient evaporative cooling section, counterbalances the less efficient dry section. Conversely, the dry cooling section, without evaporation, conserves the water. Thus, the overall tower is capable of evaporative cooling to lower temperatures than previously obtainable without excessive evaporative losses in dry climates. This system is particularly adapted for converting old wet towers to wet-dry towers without significant loss in performance. It is to be understood that, although the above system is illustrated in which the liquid supply of the wet section is from a dry section, the liquid supply to the wet section may be supplemented or be entirely composed of liquid from another source to be cooled.

I claim:

1. A wet-dry tower for contacting liquid and gas comprising an upper dry tubular heat exchange section superposed above a lower sloped wet film fill section, a gas outlet opening and an upper gas inlet opening in said tower, tubular heat exchange means including at least one heat exchange tube with an inlet and an outlet and disposed in said upper portion of tower to be contacted by gas entering said upper gas inlet opening, means for supplying liquid by gravity flow to the upper portion of said sloped film fill section, a lower gas inlet opening in said tower, film fill means mounted in said tower having opposed upper and lower surfaces, said film fill means having a principal plane inclined at an angle of between about 20° and 70° to the vertical, the lower surface of said film fill means being disposed to be contacted by gas entering said lower gas inlet opening, said upper surface being disposed below said film fill section liquid supply means to intersect liquid gravitating therefrom and being in communication with said gas outlet opening, said film fill means comprising a plurality of upright sheets mounted so that adjacent sheets are sufficiently spaced apart for the passage of gas and liquid, and splash-type fill disposed between said film fill means and said film fill section liquid supply means to provide increased liquid distribution onto the film fill means.

2. The tower of claim 1 in which the sheets of the film fill means are upright to provide a generally vertical path to the gravitating liquid.

3. The tower of claim 1 in which the film fill means comprises a plurality of film forming corrugated sheets having ridges and grooves, said sheets being mounted in generally parallel side-by-side relationship so that sufficient space is provided between grooves of adjacent sheets for the passage of gas and liquid.

4. The tower of claim 3 in which said ridges of alternative sheets contact and cross the ridges disposed between adjacent sheets so that liquid redistributes at the intersection points.

5. The tower of claim 1 including splash-type fill disposed between said film fill means and lower gas inlet opening.

6. The tower of claim 1 together with means for conveying liquid from the outlet of said heat exchange tube to said liquid supply means for said film fill section.

7. The tower of claim 6 in which said liquid conveying means includes valve means having a first position for conveying liquid to said film fill section and a second position for bypassing the film fill section.

8. The tower of claim 6 in which the liquid supply means for said film fill section comprises liquid spray means including at least one conduit with spray nozzles above said film fill means.

9. The tower of claim 1 in which the liquid supply means for said film fill section comprises a perforated pan and said heat exchange tube outlet is disposed above said pan in position to deposit water in the same.

* * * * *